United States Patent [19]

Vissers

[11] Patent Number: 5,420,788
[45] Date of Patent: May 30, 1995

[54] METHOD FOR PROCESSING DATA IN 2D AND 3D COMPUTED X-RAY TOMOGRAPHY

[75] Inventor: Daniel R. Vissers, Cincinnati, Ohio

[73] Assignee: General Electric Company, Cincinnati, Ohio

[21] Appl. No.: 103,376

[22] Filed: Aug. 9, 1993

[51] Int. Cl.⁶ .................... A61B 6/03; G01N 23/083
[52] U.S. Cl. .................. 364/413.18; 378/10; 378/15; 378/901
[58] Field of Search ............... 364/413.14, 413.16, 364/413.18; 378/4, 10, 15, 901

[56] References Cited

U.S. PATENT DOCUMENTS

| | | | |
|---|---|---|---|
| 4,740,896 | 4/1988 | Horiba et al. | 364/413.18 |
| 5,068,882 | 11/1991 | Eberhard | 378/4 |
| 5,073,910 | 12/1991 | Eberhard et al. | 378/4 |
| 5,257,183 | 10/1993 | Tam | 364/413.19 |
| 5,341,460 | 8/1994 | Tam | 395/119 |
| 5,355,309 | 10/1994 | Eberhard et al. | 364/413.15 |
| 5,365,560 | 11/1994 | Tam | 378/8 |

Primary Examiner—Paul M. Dzierzynski
Assistant Examiner—David Vernon Bruce
Attorney, Agent, or Firm—Jerome C. Squillaro; Bernard E. Shay

[57] ABSTRACT

A method of image processing is provided for generating an image of an object in a computer X-ray tomography apparatus having an X-ray source and a detector. The method desirably permits relatively coarse spacing between adjacent detector views and correspondingly lowers exposure to X-ray radiation while maintaining a high resolution image. The method includes the step of acquiring actual detector data for multiple views of the object. After actual detector data is acquired for adjacent views of the object, the actual detector data from these adjacent views is interpolated to obtain virtual detector data between the adjacent views as though a virtual detector had been placed therebetween. The actual detector data and the resultant virtual detector data is then mapped into Radon space. The process is repeated until Radon space is sufficiently filled with actual detector data and virtual detector data to permit image reconstruction. A Radon inversion is then performed on the filled Radon space to reconstruct the image.

6 Claims, 4 Drawing Sheets

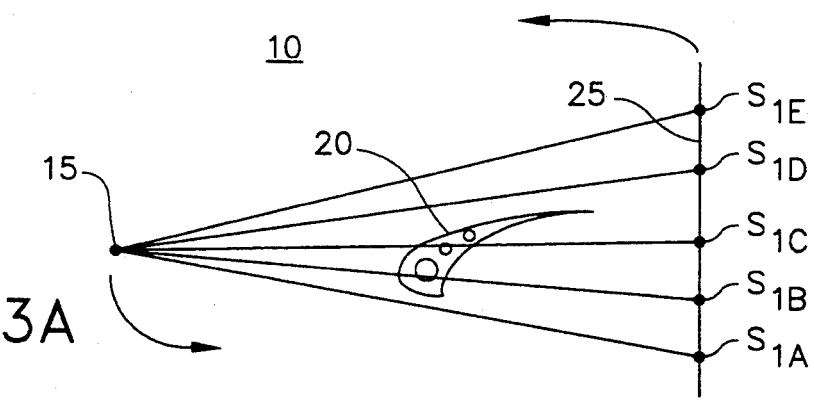
FIG. 3A
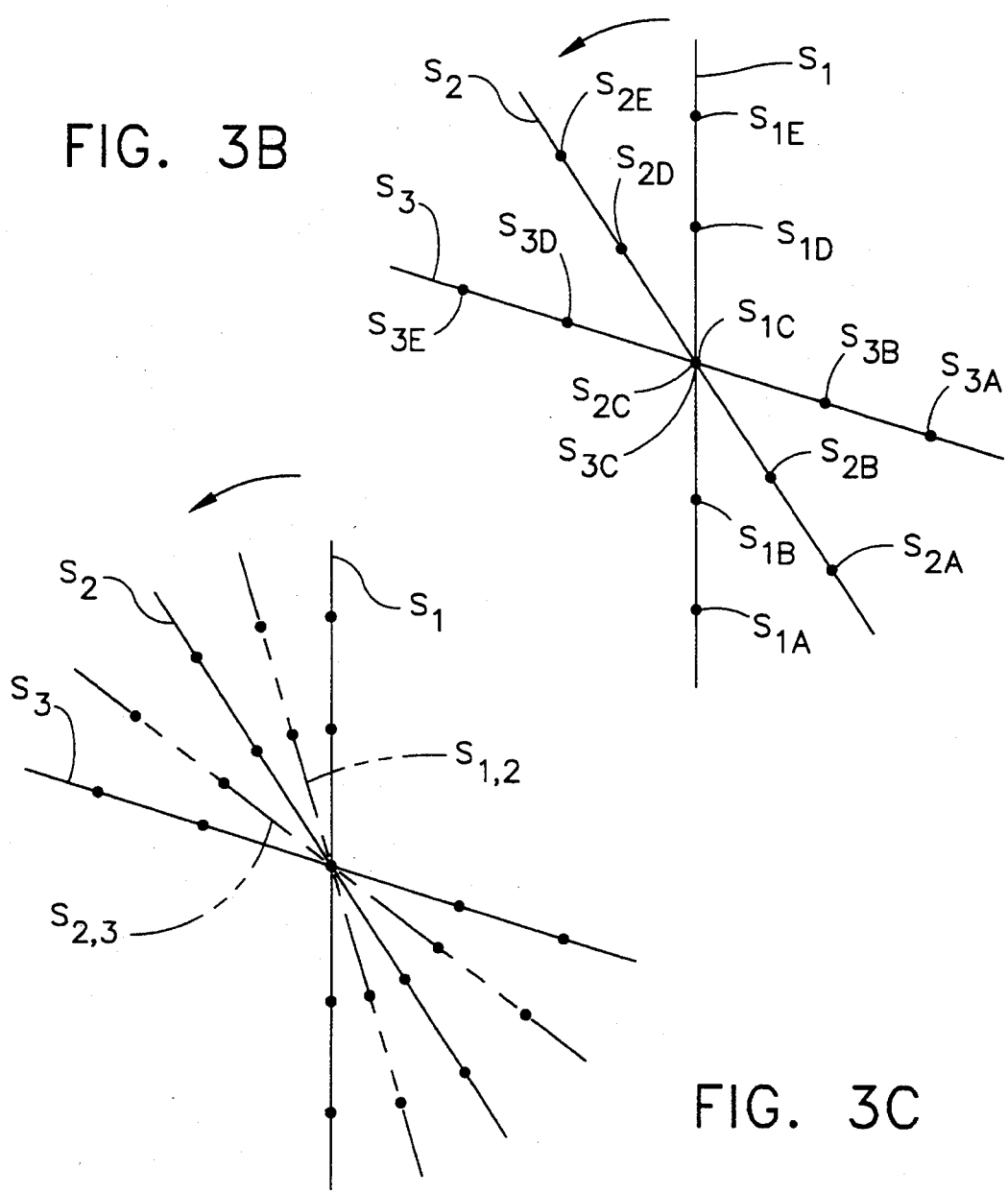
FIG. 3B
FIG. 3C

- MEASURED DETECTOR VALUE
- VIRTUAL DETECTOR VALUE
- × DESIRED VIRTUAL DETECTOR VALUE

- MEASURED DETECTOR VALUES
- ○ VIRTUAL DETECTOR VALUES FROM Z DIRECTION INTERPOLATION
- □ VIRTUAL DETECTOR VALUES FROM RADIAL INTERPOLATION
- × DESIRED VIRTUAL DETECTOR VALUES FROM ANGULAR INTERPOLATION @ $(r,\varphi,z)$

METHOD FOR PROCESSING DATA IN 2D AND 3D COMPUTED X-RAY TOMOGRAPHY

BACKGROUND OF THE INVENTION

This invention relates in general to X-ray tomography and, more particularly, to methodology for processing image data with respect to X-ray tomography.

In general, the process of generating an image with computer X-ray tomography involves exposing a test object to X-rays from an X-ray source. The test object is placed between the X-ray source and a detector array which samples the radiation passing through the test object. Those portions of the object which are more dense pass less radiation through to the detector array than do portions of the test object which are less dense. The object may be rotated to provide a plurality of different views, or alternatively, the X-ray source and detector array may be rotated together to provide such different views. Tomography can be used to generate either two dimensional (2D) or three dimensional (3D) images.

In more detail, the conventional 2D tomography method involves the step of orienting the test object in a first position and exposing the test object to the X-ray source. The resultant detector data is acquired in the form of a linear array of samples. The test object is then rotated and another linear array of samples is obtained. Several linear arrays of samples are obtained in this manner and are used to fill a Radon space. Once the Radon space is filled, an inversion is performed on the Radon space to obtain a 2D image.

A 3D image can be created by a similar approach wherein a planar array of samples is taken at each rotation of the test object. The resultant planar arrays of samples are used to fill a Radon space and, once filled, the Radon space is inverted to obtain a 3D image. One of several known computed tomography algorithms are employed to provide this inversion to construct the final image. See, for example, U.S. Pat. Nos. 5,068,882 and 5,073,910 which describe Radon space conversion algorithms.

To obtain relatively high resolution images with the conventional techniques described above, it is often necessary to employ very fine angular steps while the test object in rotated. This results in a large number of linear arrays of samples or planar arrays of samples. Unfortunately, this also results in relatively high exposure of the test object to X-rays since so many arrays of samples must be taken.

Undesired artifacts in the final image are known to result if the number of sample arrays is too small or the angular steps between sample arrays are too coarse. To avoid these artifacts, the usual approach is to make the angular steps between sample arrays (detector angles or test object angles) relatively fine or to interpolate in Radon or Fourier space. Such interpolation in Radon space is computationally intensive and fraught with difficulties due to relatively low correlation of adjacent samples in Radon space.

Unfortunately, the problem of insufficient Radon filling is often ignored resulting in undesired artifacts appearing in the resultant image. Even with a relatively high number of samples taken at various finely stepped detector test object angles, image artifacts sometimes result.

SUMMARY OF THE INVENTION

Accordingly, one object of the present invention is to provide a method of computed tomography wherein the number of sample arrays taken can be much fewer than conventional approaches.

Another object of the present invention is to provide a method of computed tomography wherein the angular steps employed to obtain the sample arrays taken can be much coarser than conventional techniques.

Yet another object of the present invention is to provide a method of computed tomography which results in significantly less exposure of the test object to X-rays.

Still another object of the present invention is to provide a method of computed tomography which generates a relatively high resolution image with a minimum number of artifacts.

In accordance with one embodiment of the present invention, a method of image processing is provided for generating an image of an object in a computer X-ray tomography apparatus having an X-ray source and a detector. The disclosed method includes the step of acquiring actual detector data for multiple views of the object. The method further includes the step of interpolating the actual detector data from adjacent views of the object to obtain virtual detector data between the adjacent views. The method also includes the step of generating Radon values in Radon space from the actual detector data and the virtual detector data. The method still further includes the step of performing a Radon inversion on the Radon space to reconstruct the image.

BRIEF DESCRIPTION OF THE DRAWINGS

The features of the invention believed to be novel are specifically set forth in the appended claims. However, the invention itself, both as to its structure and method of operation, may best be understood by referring to the following description and accompanying drawings.

FIG. 3A is a side view of an X-ray tomography apparatus on which the method of the present invention may be employed in the 2D image case.

FIG. 3B is a representation of actual detector data taken at multiple angular 2D views of a test object.

FIG. 3C is a representation of actual detector data and virtual detector data taken at multiple angular 2D views of a test object.

DETAILED DESCRIPTION OF THE INVENTION

Standard computer tomography inversion algorithms are based on the filling of Radon space. If the Radon space for any particular test object is not properly filled, the reconstructed image suffers from various artifacts. The methodology below describes a technique for filling in Radon space locations which are not filled in by the discrete source positions of a particular scan path from the X-ray source object to the test object. The Radon space filling is accomplished by interpolating appropriate detector locations and using the resultant interpolated information as input to the known computer tomography inversion algorithm which generates the image. By interpolating detector locations, the number of data acquisition position/locations required for a complete Radon space filling is dramatically reduced. This leads to shorter sample array data acquisition times, a reduction in necessary X-ray dosage and a significant enhancement of image quality given any fixed data set.

Figure 1:
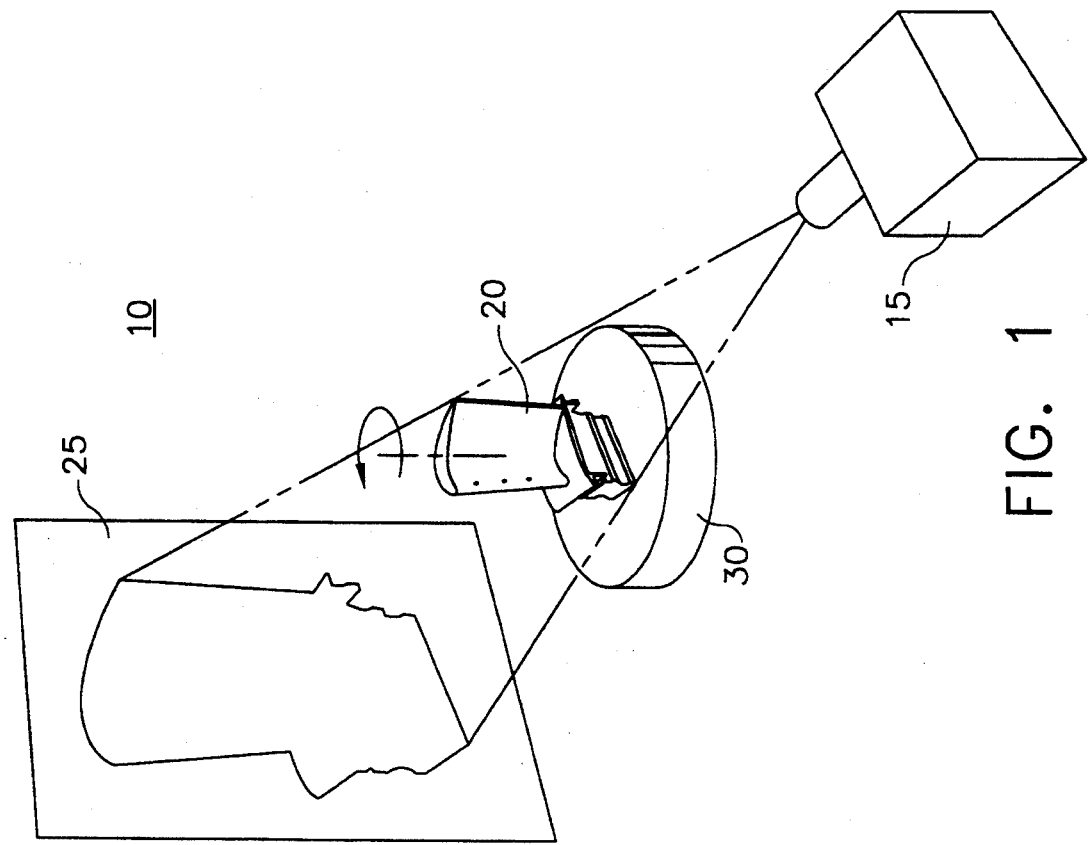
FIG. 1 is a perspective view of an X-ray tomography apparatus on which the method of the present invention may be employed.

FIG. 1 shows a simplified perspective view of a tomography apparatus 10 on which the method of the invention may be employed. Tomography apparatus 10 includes an X-ray source 15 which exposes a test object 20 to X-rays. Test object 20 is situated on a rotatable pedestal 30. Test object 20 is rotated, angular step by angular step, and a respective sample array is detected by detector 25 at each angular step. Alternatively, test object 20 can remain stationary while X-ray source 15 and detector 25 are rotated in step fashion.

Figure 2:
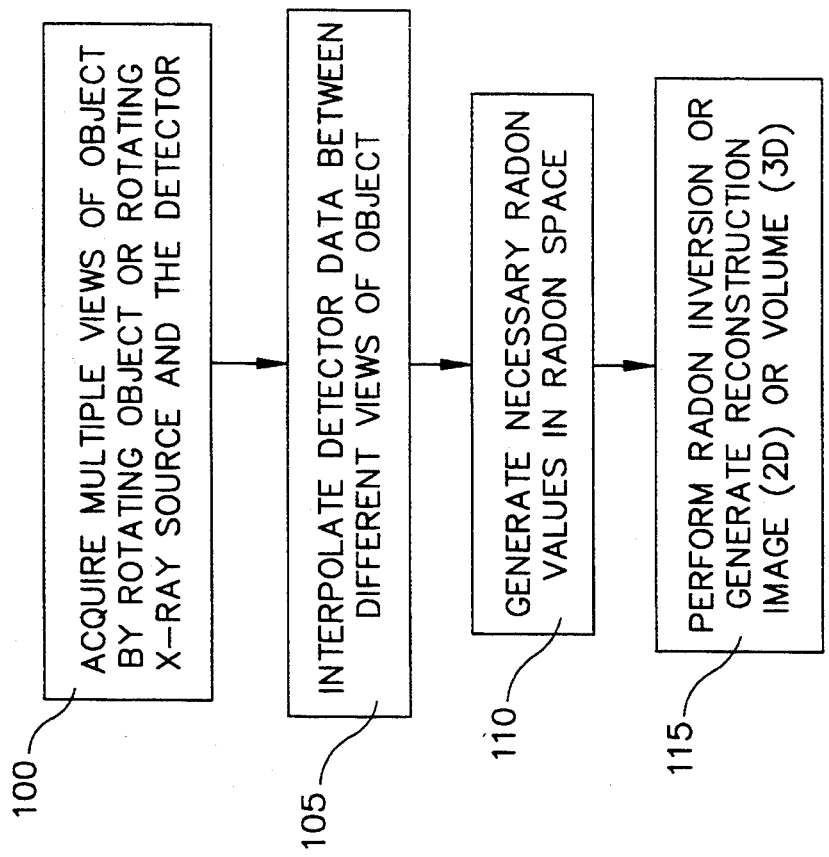
FIG. 2 is a flowchart showing the steps of the method of the present invention.

FIG. 2 is a flow chart which depicts the steps of the method of the invention in general form. As indicated at block 100, multiple views of test object 20 are acquired by rotating the object or rotating the X-ray source and the detector. Detector data is thus obtained. Whereas prior approaches required a very large number of sample steps to be taken with a corresponding very fine angular spacing between steps of approximately 0.25 degrees, for example, the present method advantageously employs much coarser values within the range of 0.5 to 1.0 degrees, for example, in one embodiment.

Then, in block 105, the detector data is interpolated between different adjacent views of the object to effectively generate detector data corresponding to a virtual view between two adjacent actual views as will be explained in more detail later. The Radon values are subsequently generated in Radon space in block 110. In other words, the Radon space is filled using the actual detector data together with the interpolated virtual detector data. Once the data is obtained in the interpolation step of block 105, filling Radon space is done in the conventional manner and thus this step need not be described in detail. With the Radon space thus filled, a Radon inversion is performed on the Radon space using a conventional computer tomography inversion algorithm in block 115 to reconstruct the image of the object.

For purposes of the subsequent discussion, it will be assumed that the X-ray source and detector are rotated in step fashion to obtain a plurality of detector arrays rather than rotating the test object.

FIGS. 3A-3C illustrate in simplified fashion how interpolation is applied in accordance with the present invention to linear detector data in the 2D case. FIG. 3A shows a side view of tomography apparatus 10 including X-ray source 15, test object 20 and detector array 25. A first set of samples $S_{1A}$, $S_{1B}$, $S_{1C}$, $S_{1D}$ and $S_{1E}$ is taken by detector 25 when test object 20 is oriented at a first relative angle with respect to source 15 and detector 25. Each sample is shown in FIG. 3A by a small black circle. The first set of samples form a linear array of samples which is designated $S_1$.

The source and detector are then stepped to a second angle and a second set of samples, linear array $S_2$, namely $S_{2A}$, $2_{2B}$, $S_{2C}$, $S_{2D}$ and $S_{2E}$ is taken (see FIG. 3B) by detector 25 when test object 20 is oriented at a second relative angle with respect to source. 15 and detector 25. Subsequently, the source and detector are then stepped to a third angle and a third set of samples, linear array $S_3$, namely $S_{3A}$, $S_{3B}$, $S_{3C}$, $S_{3D}$ and $S_{3E}$ is taken (see FIG. 3B) by detector 25 when test object 20 is oriented at a third relative angle with respect to source 15 and detector 25.

Interpolation is then used to generate virtual linear arrays of samples between adjacent actual linear arrays of samples. For example, a virtual linear array of samples ($S_{1,2}$) is generated between actual linear array $S_1$ and actual linear array $S_2$ as seen in FIG. 3C. Similarly, a virtual linear array of samples ($S_{2,3}$) is generated between actual linear array $S_2$ and actual linear array $S_3$.

Figure 4:
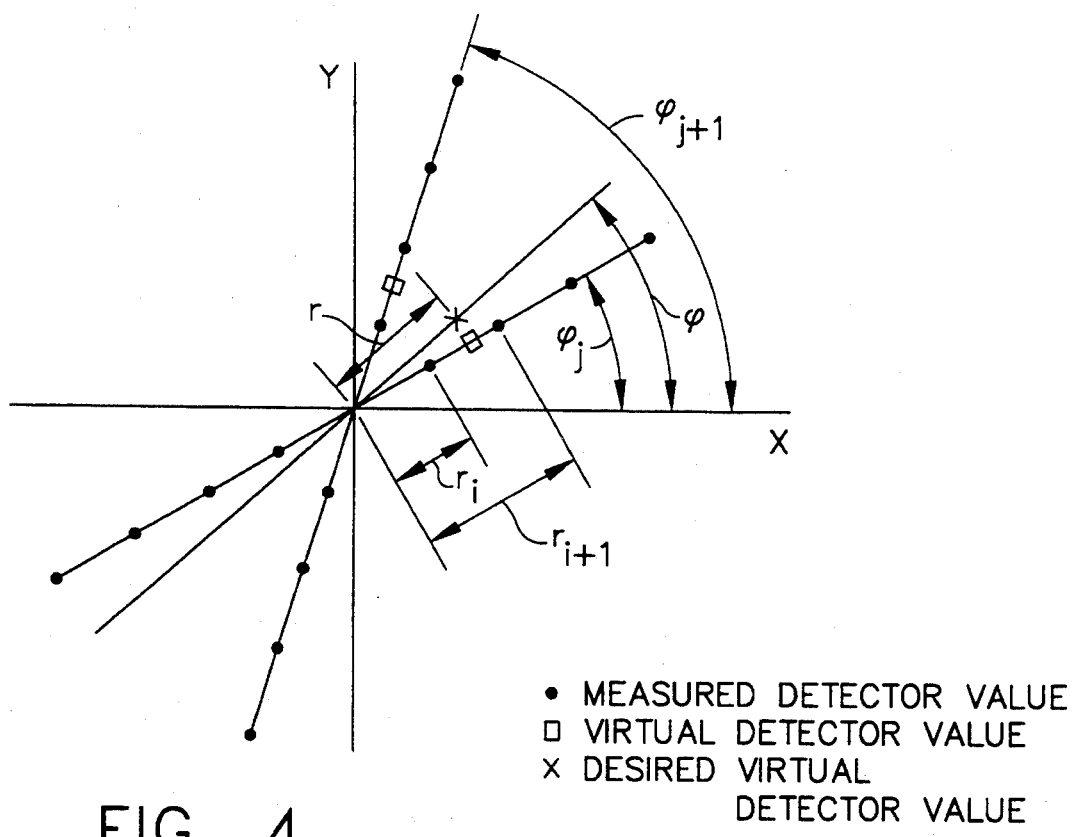
FIG. 4 is a more detailed representation of actual detector data and virtual detector data taken at multiple angular 2D views of a test object.

Many different approaches can be used to accomplish the interpolation set forth generally above in simplified fashion. For example, FIG. 4 illustrates in more detail one particular interpolation approach which may be employed to carry out interpolation in the 2D case. In FIG. 4 the following labels are employed:

. designates the measured detector value,

☐ designates the virtual detector value, and x designates the desired virtual detector value.

For the 2D case, the interpolation involves two interpolation stages. In the first stage, an interpolation is conducted for each view (i.e., each linear sample set) in the radial direction to obtain a virtual detector value at the particular angle for that view. Thus, this is a radial interpolation step which generates a virtual detector value (V or ☐) at the desired radial location in each view as seen in FIG. 4. By each view, we mean that to generate the actual linear sample sets (of measured detector values M or .) we are stepping through a series of angles $\emptyset_j$ and taking a sample set at each angle. Each angle $\emptyset_j$ corresponds to each detector view at which detector 25 takes a plurality of linear samples $r_i$, $r_{i+1}$, ... $r_{i+n}$ (measured detector values M or .).

The first stage thus involves an interpolation in each view in the radial direction. More particularly, with reference to FIG. 4, $$V(r,\emptyset_j) = \lambda_r M(r_i,\emptyset_j) + (1-\lambda_r) M(r_{i+1},\emptyset_j)$$

$$V(r,\emptyset_{j+1}) = \lambda_r M(r_i,\emptyset_{j+1}) + (1-\lambda_r) M(r_{i+1},\emptyset_{j+1})$$

wherein

V is a virtual detector sample value at a particular radius r and at a particular angle $\emptyset$.

M is a measured or actual detector sample value at a particular radius r and at a particular angle $\emptyset$, and $\lambda_r = (r_{i+1} - r)/(r_{i+1} - r_i)$.

The second stage of interpolation in the 2D case involves an interpolation of the virtual detector values (V or ☐) at the desired radial location in the angular direction to generate the virtual detector value at the desired location.

The second stage thus involves an interpolation in the angular direction between adjacent virtual detector values (V or □) in adjacent views to obtain a desired virtual detector value x. More particularly, with reference to FIG. 4, $$V(r,\emptyset) = \lambda_\emptyset V(r,\emptyset_j) + (1-\lambda_\emptyset)V(r,\emptyset_{j+1})$$

wherein $$\lambda_\emptyset = (\emptyset_{j+1} - \emptyset)/(\emptyset_{j+1} - \emptyset_j)$$

V is a virtual detector sample value at a particular radius r and at a particular angle $\emptyset$;

The actual measured detector values and desired virtual detector values obtained by this interpolation process are mapped into Radon space. The process described above is repeated a multiple number of times at different views until the Radon space is filled with enough actual values and virtual values to enable a Radon space inversion to be performed that will result is a relatively high resolution 2D image. A much coarser step angle can be used in the disclosed process than in prior 2D tomography image processes. For example, it has been found that a relatively coarse angular step within the range of approximately 0.5 to approximately 1.0 degrees for angle $\emptyset_j$ produces acceptable results whereas the relatively fine angular step for earlier tomographic image processes was typically 0.25 degrees or less.

Figure 5A:
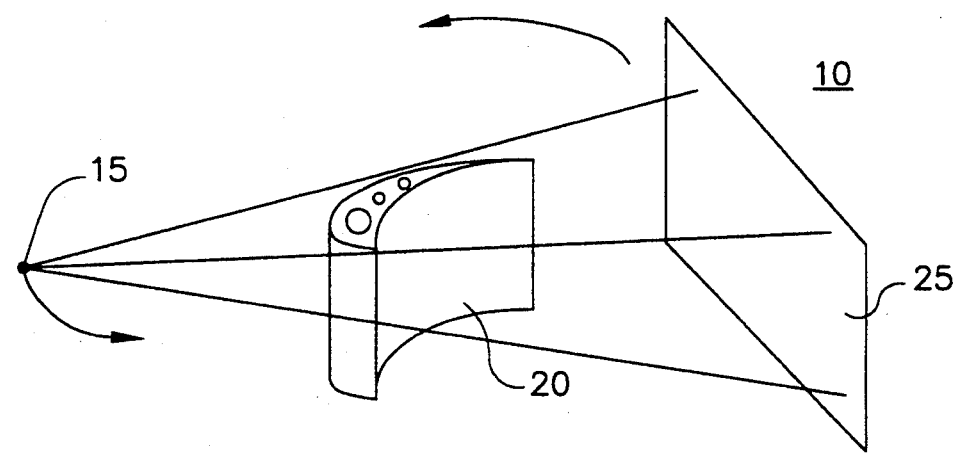
FIG. 5A is a side perspective view of an X-ray tomography apparatus on which the method of the present invention may be employed in the 3D image case.
Figure 5B:
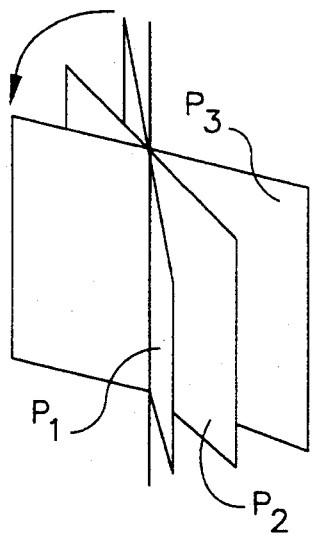
FIG. 5B is a representation of actual detector data taken at multiple angular 3D views of a test object.

FIG. 5A shows a perspective view of tomography apparatus 10 including X-ray source 15, test object 20 and detector array 25 on which the 3D tomography method of the present invention will be practiced. In accordance with the method, at each view angle $\emptyset$ through which the apparatus steps, detector 25 detects a planar array of samples. For example, planar arrays of samples P1, P2 and P3 are detected at respective view angles as illustrated in FIG. 5B. Again, the step angle through which the apparatus steps while taking these planar arrays of samples is relatively coarse as compared with earlier tomographic imaging processes.

Figure 5C:
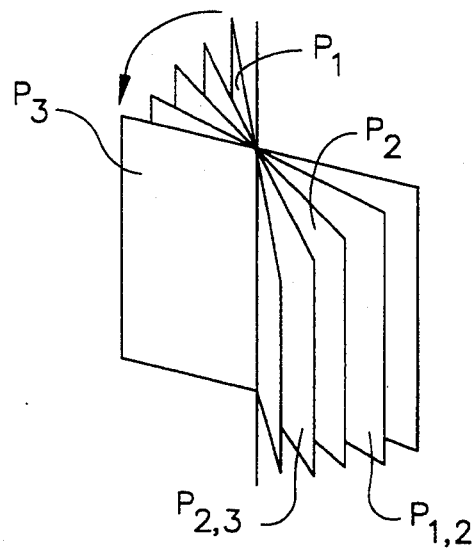
FIG. 5C is a representation of actual detector data and virtual detector data taken at multiple angular 3D views of a test object.

Interpolation is employed to generate a virtual planar array of samples between adjacent actual planar arrays of samples. For example, as illustrated in FIG. 5C, a virtual planar array of samples, $P_{1,2}$ is generated by interpolation between the $P_1$ and $P_2$ actual sample arrays. Similarly, a virtual planar array of samples, $P_{2,3}$ is generated by interpolation between the $P_2$ and $P_3$ actual sample arrays. This interpolation process continues at multiple view angles as generated by stepping the test object through a plurality of angles as determined by the selected step angle size. The Radon space is then sufficiently filled with actual planar arrays of samples and virtual arrays of samples to enable an inversion in accordance with known Radon inversion techniques to generate the resultant image.

Figure 6:
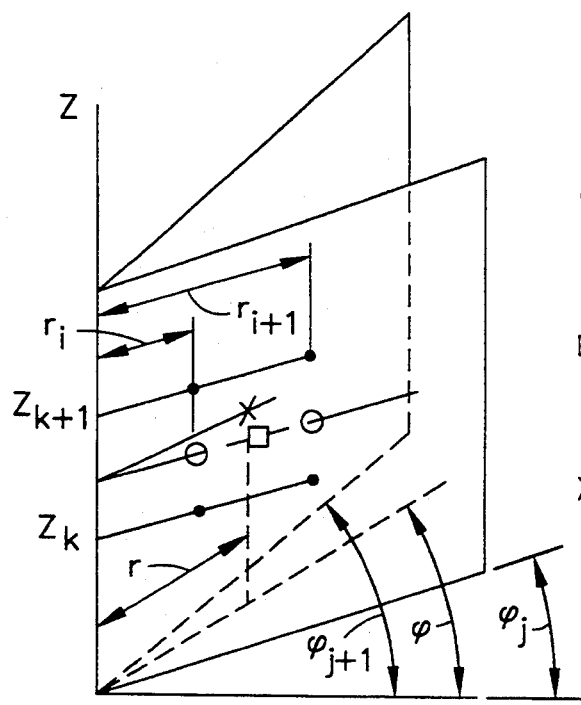
FIG. 6 is a more detailed representation of actual detector data and virtual detector data taken at multiple angular 3D views of a test object.

Many different approaches can be used to accomplish the interpolation set forth generally above in simplified fashion for the 3D case. FIG. 6 illustrates in more detail one particular interpolation approach which may be employed to carry out interpolation in the 3D case. In FIG. 6 the following labels are employed:

. designates the measured detector values,
○ designates the virtual detector values from z direction interpolation,
□ designates the virtual detector values from radial interpolation, and
x designates the desired virtual detector value from angular interpolation at location, $(r,\emptyset,z)$.

For the 3D case, the interpolation of the measured detector values involves three interpolation stages, that is, one more stage than the 2D case. The measured detector values are located at $(r_i, \emptyset_j, z_k)$ where i, j and k are integers. The first stage begins by interpolating the measured values two times in each view. By each view, we mean a planar array of measured detector values at a discrete angular position, $\emptyset_j$. Each view encompasses a planar array of values referenced by a discrete radial position, $r_i$ and a discrete height, $z_k$. The z direction interpolation generates two virtual detector locations (○) in each view at the desired z location as seen in FIG. 6. In the example of FIG. 6, a total of four virtual detector locations or values (○) are thus generated (two for each view).

The second stage interpolates the two virtual detector values at the desired z location in each view in the radial direction. This radial interpolation step generates a virtual detector value (□) at the desired z location and the desired radial location for each view. In this manner, a total of two virtual detector values (□) are generated, one for each view.

The third stage interpolates the virtual detector value at the desired z location and the desired radial location of each view in the angular direction to generate a virtual detector value at the desired location, x.

The above described three stage interpolation process is repeated with different adjacent detector views as apparatus 10 steps through different angular detector positions in the manner described earlier.

The actual measured detector values and desired virtual detector values obtained by this interpolation process are mapped into Radon space. In other words, for the 3D case, the process described above is repeated a multiple number of times at different views until the Radon space is filled with enough actual values and virtual values to enable a Radon space inversion to be performed that will result is a relatively high resolution 3D image. A much coarser step angle can be used in the disclosed process than in prior 3D tomography image processes. For example, it has been found that a relatively coarse angular step within the range of approximately 0.5 to approximately 1.0 degrees for angle $\emptyset_j$ produces acceptable results whereas the relatively fine angular step for earlier tomographic image processes was typically 0.25 degrees or less.

The foregoing has described a method for processing data in 2D and 3D computed X-ray tomography wherein the number of sample arrays taken can be much fewer than conventional approaches. Moreover, a method of computed tomography is provided wherein the angular steps employed to obtain the sample arrays can be much coarser than conventional techniques. Further, the provided method results in significantly less exposure of the test object to X-rays while generating a relatively high resolution image with a minimum number of artifacts.

While only certain preferred features of the invention have been shown by way of illustration, many modifications and changes will occur to those skilled in the art. It is, therefore, to be understood that the present claims are intended to cover all such modifications and changes which fall within the true spirit of the invention.

What is claimed is:

1. A method of image processing for generating an image of an object in a computer X-ray tomography apparatus having an X-ray source and a detector, said method comprising the steps of:

acquiring actual detector data for multiple views of said object;

interpolating said actual detector data from adjacent views of said object to obtain virtual detector data between said adjacent views;

generating Radon values in Radon space from said actual detector data and said virtual detector data, and performing a Radon inversion on said Radon space to reconstruct said image.

2. The method of claim 1 wherein said image is a 2 dimensional image and said acquiring step further comprises generating a linear array of samples for each view.

3. The method of claim 1 wherein said image is a 3 dimensional image and said acquiring step further comprises generating a planar array of samples for each view.

4. The method of claim 1 wherein said acquiring step further comprises obtaining said multiple views of said object by rotating said object with respect to said detector and said X-ray source.

5. The method of claim 1 wherein said acquiring step further comprises obtaining said multiple views of said object by rotating said detector and said X-ray source object with respect to said object.

6. The method of claim 1 wherein said acquiring step further comprises the step of stepping through a plurality of view angles to obtain said actual detector data by employing a relatively coarse step angle within the range of approximately 0.5 degrees to approximately 1.0 degrees separating said view angles.

* * * * *